(12) United States Patent
Derman et al.

(10) Patent No.: US 11,565,226 B2
(45) Date of Patent: Jan. 31, 2023

(54) CONVEYOR SYSTEM AND METHOD

(71) Applicant: EnerMech Pty Ltd, Artamon (AU)

(72) Inventors: Glen Derman, Canning Vale (AU);
Rory Sharp, Yangebup (AU)

(73) Assignee: EnerMech Pty Ltd, Artamon (AU)

( * ) Notice: Subject to any disclaimer, the term of this patent is extended or adjusted under 35 U.S.C. 154(b) by 0 days.

(21) Appl. No.: 17/253,758

(22) PCT Filed: Jun. 17, 2019

(86) PCT No.: PCT/AU2019/050623
§ 371 (c)(1),
(2) Date: Dec. 18, 2020

(87) PCT Pub. No.: WO2019/241835
PCT Pub. Date: Dec. 26, 2019

(65) Prior Publication Data
US 2021/0268462 A1 Sep. 2, 2021

(30) Foreign Application Priority Data
Jun. 18, 2018 (AU) ................................ 2018902169

(51) Int. Cl.
| | |
|---|---|
| *B65G 19/14* | (2006.01) |
| *B01J 8/00* | (2006.01) |
| *B65G 47/19* | (2006.01) |
| *B65G 65/32* | (2006.01) |
| *B65G 69/16* | (2006.01) |

(52) U.S. Cl.
CPC .............. *B01J 8/002* (2013.01); *B01J 8/003* (2013.01); *B01J 8/0045* (2013.01); *B65G 19/14* (2013.01); *B65G 47/19* (2013.01); *B65G 65/32* (2013.01); *B65G 69/16* (2013.01); *B01J 2208/00752* (2013.01); *B01J 2208/00769* (2013.01)

(58) Field of Classification Search
CPC .............................. B65G 17/126; B65G 19/14
See application file for complete search history.

(56) References Cited

U.S. PATENT DOCUMENTS

| | | | | |
|---|---|---|---|---|
| 2,756,866 A | * | 7/1956 | Wilde, Jr. ............... | B65G 19/14 198/716 |
| 2,985,486 A | * | 5/1961 | Mortensen ............. | B65G 19/14 406/81 |

(Continued)

FOREIGN PATENT DOCUMENTS

| | | | | |
|---|---|---|---|---|
| CN | 111252481 B | * | 6/2021 | ............. B65D 88/68 |

*Primary Examiner* — Joseph A Dillon, Jr.
(74) *Attorney, Agent, or Firm* — Greenberg Traurig, LLP

(57) ABSTRACT

A particular embodiment of the invention relates to a conveyor system (10) for conveying material (for example: particulate material such as a catalyst) from a particular storage area (such as drum (18)) to a second location (such as a reactor (13)). In accordance with the present embodiment of the invention, the conveyor system (10) is adapted to isolate from the environment the particular material to be conveyed; thus, avoiding that the particular material enters in contact with, for example, the atmosphere. Isolating the particular material is particular advantageous; because, for example, the isolation process suppresses activation of the material (such as the catalyst) due to coming in direct contact with the oxygen and moisture content of the atmosphere.

20 Claims, 13 Drawing Sheets

(56) References Cited

U.S. PATENT DOCUMENTS

| | | | | |
|---|---|---|---|---|
| 3,540,569 | A * | 11/1970 | Herington | B65G 17/126 198/550.11 |
| 6,491,480 | B2 * | 12/2002 | Waddell | B65G 19/14 406/81 |
| 6,502,689 | B2 * | 1/2003 | Mitchell | B65G 67/06 198/716 |
| 7,228,956 | B2 * | 6/2007 | Pircon | B65G 11/126 198/560 |
| 8,061,524 | B2 * | 11/2011 | Camoriano | B01J 8/003 414/196 |
| 9,493,309 | B2 * | 11/2016 | Kamps | B65G 45/18 |
| 10,131,500 | B2 * | 11/2018 | Nicholson | B65G 19/14 |
| 2007/0170043 | A1 * | 7/2007 | Raijmakers | B65G 19/14 198/716 |
| 2009/0097958 | A1 * | 4/2009 | Camoriano | B01J 8/003 414/806 |
| 2009/0097985 | A1 * | 4/2009 | Lea-Wilson | F04B 9/125 417/26 |
| 2014/0190794 | A1 * | 7/2014 | Rudolfo Van Arragon | B65G 65/40 198/730 |
| 2014/0311872 | A1 * | 10/2014 | Podevyn | B65G 19/14 198/728 |
| 2020/0223649 | A1 * | 7/2020 | Forsberg | B65G 47/16 |

* cited by examiner

CONVEYOR SYSTEM AND METHOD

RELATED APPLICATIONS

This application is a U.S. national phase application of PCT International Patent Application No. PCT/AU2019/050623, filed on Jun. 17, 2019, which claims the benefit of and priority to AU patent application no. 2018902169, filed Jun. 18, 2018, each of which are hereby incorporated by reference in their entireties.

TECHNICAL FIELD

The present invention relates to systems and processes for conveying materials from one location to another location.

The invention has been devised particularly, although not necessarily solely, in relation to a process and assembly for lifting catalyst and associated method of use, more particularly, the invention relates to a catalyst loading of a reactor and an associated method of use.

BACKGROUND ART

The following discussion of the background art is intended to facilitate an understanding of the present invention only. The discussion is not an acknowledgement or admission that any of the material referred to is or was part of the common general knowledge as at the priority date of the application.

Catalyst media may be unloaded from a reactor for a variety of reasons such as for statutory inspection or operation purposes. On completion of the statutory inspections and or operational repairs, it is required that fresh catalyst be reloaded into the reactor, prior to the reactor being brought back into operation.

Handling and transportation of catalyst media is typically cumbersome and thus require proper handling and transportation so as not to compromise the integrity of the catalyst media. This is particularly true for some catalyst media that react when exposed to the atmosphere thus activation of the catalyst media may occur prior entering the reactor. For example, some catalyst media is self-heating when exposed to the atmosphere (oxygen).

Another issue with handling and transportation of catalyst media is that their moisture content should not increase during handling and transportation. Relative high moisture content of the catalyst media prior conveying the catalyst media into the reactor can be problematic because it will affect proper operation of the particular reactions occurring within the reactor. Thus, catalyst media should not be exposed to high humidity and or adverse weather conditions (in particular, heavy rains) during loading of the catalyst media into the reactor.

Custom practice is to decant new catalyst media from UN rated drums into bulka bags which are brought to the vicinity of the reactor as required. Once the bulka bags are at the vicinity of the reactor, the Bulka bags full of catalyst media are lifted by a crane and located above the reactor. The catalyst media is then dumped from the bulka bag into a loading hopper situated above the reactor for capturing and guiding the catalyst into the reactor manway.

During the above operation, there is much attrition to catalyst media and the catalyst media can be exposed to the elements (e.g.: atmospheric air, moisture) for even brief periods; moisture content of the catalyst media increases in adverse weather condition, in particular during rains and high humidity conditions.

Also, another problem with the above operation is the need to use cranes for lifting of the bulka bags. The use cranes has disadvantages such as: (1) areas adjacent the reactor need to be cleared from personnel; thus, any works conducted in the vicinity of the reactor need to stopped and (2) the lifting process using the cranes need to stopped during adverse wind conditions (such as wind conditions that prohibit crane operation) that may compromise the integrity of the crane and of the entire catalyst media loading operation. The consequence of this is that the process may not provide a continuous loading rate of catalyst media due to being prone to stoppages and delays.

Further, the above process is not scalable in that multiple crane movements in a restricted area are not deemed safe.

Furthermore, US patent publication 20090097985 discloses a method and system for delivering catalysts into a reactor. The system comprise a conveyor-like belt comprising pouches for containment of the catalyst in isolated condition to impede the catalyst entering in contact with the atmosphere. In accordance with the disclosure of this US patent publication, the conveyor-like belt needs to be prepared (prior delivery of the catalyst to the reactor) by filling each pouch with the catalyst; once all pouches are filled, the belt is delivered (via a spokes assembly) to the reactor where personnel proceed to extract the catalyst from the pouches and deliver it into reactor tubes. Once, the pouches are emptied, the belt is retrieved from the reactor by reversing the direction of rotation of the From the above descriptions, it is evident that the process described in US patent publication 20090097985 is cumbersome and requires personnel from entering in contact with the catalyst; also, the process does not provide a continuous (such as using an endless conveyor belt) for delivery of the catalyst without the intervention of personal needed for handling of the catalyst; in fact, the belt with the pouches are delivered to the reactor once the pouches have been emptied, the belt needs to retrieved from the reactor for delivery of the subsequently belt in case more catalyst is required for filling of the reactor. Further, the fact that the pouches are pre-packed and all of the same volume does not permit adjusting the feeding rate of the catalyst into the reactor.

It is against this background that the present invention has been developed.

SUMMARY OF INVENTION

According to a first aspect of the invention there is provided a loading assembly for receiving material from a first location and providing material to at least one compartment of a conveyor chain for delivery to a second location, the loading assembly comprising a loading hopper having a first inlet adapted to deliver the material into an inner volume of the loading hopper and a first passage traversing the loading hopper adapted for the conveyor chain to traverse the loading hopper permitting delivery of at least a particular quantity of material to the compartment of the conveyor chain for delivery to a vessel.

Preferably, the inner volume is isolated from the exterior of the loading hopper.

Preferably, the first location comprises a storage area adapted to receive the material, wherein the storage area is isolated from the exterior of the storage area.

Preferably, the second location comprises a vessel adapted to receive the material, wherein the vessel is isolated from the exterior of the storage area.

Preferably, the first inlet is adapted to receive the storage area such that delivery of the material occurs isolated from the exterior of the loading hopper and the storage area.

Preferably, the storage area comprises a drum.

Preferably, the first inlet comprises a chute section having a first end adapted for sealing attachment to the loading hopper and a second end adapted to be releasably and sealingly attach the drum to the second end.

Preferably, the first end is rotatably attached to the first inlet permitting rotation of the drum for tipping of the drum.

Preferably, the first inlet comprises a valve arrangement for impeding access of atmospheric air into the loading hopper.

Preferably, the first inlet comprises a driving mechanism rotating the chute section for tipping of the drum.

Preferably, the second end of the chute section comprises a clamping assembly adapted to clamp one end of the drum to the clamping assembly for attachment of the drum to the chute section.

Preferably, the clamping assembly comprises means for opening of the drum after clamping of the drum has occurred.

Preferably, the loading assembly further comprises a transportation mechanism for delivering the drum to the loading assembly.

Preferably, the loading hopper is adapted to deliver a particular quantity of material into the compartment of the conveyor.

Preferably, the loading hopper comprises a valve mechanism to deliver the particular quantity of the material into the compartment of the conveyor.

Preferably, the passage traversing the loading hopper comprises a valve mechanism.

Preferably, the valve mechanism comprises an inner pipe section that traverses the loading hopper from its inlet to its outlet permitting the conveyor chain to slide through the inner pipe section of the valve mechanism, and an outer pipe section surrounding the inner pipe section.

Preferably, the inner pipe section is adapted to allow particular quantities of material to be fed into the compartments as they traverse the inner pipe section.

Preferably, the outer pipe section is adapted to be located at particular locations along the inner pipe section for adjusting the size of the aperture defined between the bottom of the loading hopper and the lower end of the pipe section.

Preferably, the valve assembly further comprises means for maintaining the outer pipe section at a particular location along the inner pipe section.

Preferably, the means for maintaining the outer pipe section at a particular location along the inner pipe section comprises an assembly for moving the outer pipe section between a lower condition and an upper condition along the inner pipe section, the assembly comprising comprises a bar having an end pivotally attached to the inner wall of the loading assembly and another end attached to outer pipe section having a upper pipe portion (the shroud) and a lower pipe portion (the sliding bush).

Preferably, the another end of the bar comprises a horseshoe shaped end for receiving the upper pipe portion; and, at each end of the horseshoe, two bars extend towards the lower pipe portion for attachment thereto.

Preferably, the distal end of the outer pipe section comprises a flange defining a skirt for defining a void (an area without material) that allows any material that is at the lip (the upper edge) of the compartment to be spilled into the void.

Preferably, the loading hopper is adapted to permit the conveyor chain to traverse the loading hopper via the passage.

Preferably, the loading hopper comprises a second inlet permitting entering of the conveyor chain into the loading hopper for collection of the material contained in the loading hopper.

Preferably, the loading hopper comprises a first outlet permitting exiting of the conveyor chain into the loading hopper for delivery of the material to the second location.

Preferably, the first outlet is adapted to sealingly receive a first end of a first pipe assembly for receiving the conveyor chain.

Preferably, the first pipe assembly is adapted to provide an inner volume isolated from the exterior of the pipe assembly defining an isolated path for the conveyor chain to travel between the loading assembly and the second location.

Preferably, the loading hopper comprises a third inlet adapted to sealingly receive a first end of a second pipe assembly for delivering the conveyor chain into the loading hopper after having returned from the second location.

Preferably, the second pipe assembly is adapted to provide an inner volume isolated from the exterior of the pipe assembly defining an isolated path for the conveyor chain to travel between the discharge assembly and the first location.

Preferably, the loading assembly comprises a second passage that traverses the loading hopper defines a path to permit traversing of the conveyor chain as it returns from the discharge assembly.

Preferably, the interior of the path of the second passage is isolated from the inner volume of the loading assembly.

Preferably, the loading assembly comprises a wheel system for varying the direction of travel of the conveyor chain.

Preferably, the wheel system comprises an idle wheel system.

Preferably, the loading hopper comprises a second outlet adapted for delivering the conveyor chain into the loading assembly.

According to a second aspect of the invention there is provided a discharge assembly for receiving a conveyor chain comprising at least one compartment with material from a first location, the discharge assembly comprising a housing having a fourth inlet for receiving the conveyor chain into an inner volume of the discharge assembly, and a third outlet to permit the conveyor chain to exit the inner volume, the housing being adapted to deliver the material to a second location wherein the inner volume of the housing is isolated from the exterior of the housing.

Preferably, the housing comprises a chute section for receiving the material from the compartment and delivering the material to the second location.

Preferably, the fourth inlet is adapted to sealingly receive a first end of a first pipe assembly for receiving the conveyor chain.

Preferably, the first pipe assembly is adapted to provide an inner volume isolated from the exterior of the pipe assembly defining an isolated path for the conveyor chain to travel between the loading assembly and the second location.

Preferably, the third outlet is adapted to receive a second end of a second pipe assembly.

Preferably, the second pipe assembly is adapted to provide an inner volume isolated from the exterior of the pipe assembly defining an isolated path for the conveyor chain to travel between the discharge assembly and the first location.

Preferably, the housing comprises a wheel system for varying the direction of travel of the conveyor system.

Preferably, the wheel system comprises a drive wheel system for driving the conveyor chain to travel around an endless path.

Preferably, the wheel system is adapted to releasably attach links of the conveyor chain to the wheel.

Preferably, the chute section comprises an opening for sealingly receive a proximal end of a discharge tube adapted for delivery of the material to the second location.

Preferably, the proximal end of the discharge tube is connected to the opening of the opening of the chute section via a flexible connection.

According to a third aspect of the invention there is provided a discharge tube for connection with a manway of a vessel for delivery of material into the vessel.

Preferably, the discharge tube is of telescopic configuration.

Preferably, a distal end of the discharge tube for containment in the vessel comprises a diffuser.

Preferably, the discharge tube comprises a plurality of tube sections adapted to be releasably attached to each other.

Preferably, the tube sections are adapted to be screwed together.

According to a fourth aspect of the invention there is provided a vessel for receiving a discharge tube for delivering material into the vessel, the vessel comprising a manway for receiving the discharge tube, wherein the manway is adapted to pivotally attach the discharge tube to the manway.

Preferably, the vessel further comprises drive means for moving of the discharge tube.

Preferably, the discharge tube comprises a discharge tube in accordance with the third aspect of the invention.

According to a fifth aspect of the invention there is provided a conveyor chain comprising a plurality of compartments and a plurality of links, each link having ends for attachment of neighbouring compartments, each compartment comprising bars that extend outward from each side of bottom regions of each compartment, wherein the ends of the links are pivotally attached to ends of the bars for attachment of neighbouring compartments.

According to a sixth aspect of the invention there is provided a conveyor system for delivering material from a first location to a second location, the conveyor system comprising the loading assembly as defined in the first aspect of the invention for feeding the material, a discharge assembly as defined in the second aspect of the invention, and a conveyor chain operatively connected between the loading assembly and the discharge assembly for moving material from the loading assembly to the discharge assembly.

Preferably, the conveyor system further comprises a first pipe assembly connected between the loading assembly and the discharge assembly, and a second pipe assembly connected between the discharge assembly and the loading assembly to provide a path to permit traveling of the conveyor chain between the loading assembly and the discharge assembly.

Preferably, the path comprises an inner volume isolated from the exterior of the first and second pipe assemblies.

Preferably, the first and second pipe assemblies are sealingly connected between the loading and discharge assembly isolating the interior of the conveyor system from the exterior.

Preferably, the second location comprises the vessel as defined in the fourth aspect of the invention.

Preferably, the discharge assembly comprises a discharge tube.

Preferably, the discharge tube comprises the discharge tube as defined in the third aspect of the invention.

Preferably, the conveyor chain comprises the conveyor chain as defined in the fifth aspect of the invention.

Preferably, the conveyor system is adapted to be operated from a remote location.

Preferably, the conveyor system comprises control means for operating of the conveyor system from a remote location.

Preferably, the conveyor system comprises monitoring means (in communication with the control means) such as sensors and video cameras to permit monitoring the operation of the conveyor system as well as the conditions within the conveyor system to ensure that no contact between the material and atmospheric air occurs during operation of the conveyor system.

According to a seventh aspect of the invention there is provided a valve assembly for feeding material to a compartment of a conveyor chain traversing a loading assembly containing the material, the valve assembly comprising an inner pipe section comprising slots for receiving material, and an outer pipe section surrounding the inner pipe section adapted to slide along the inner pipe section to locate the outer pipe section at a particular location along the inner pipe section for adjusting the amount of material that enters the inner pipe section, wherein a lower end of the outer pipe section comprises a flange for defining a skirt to create a void of material under the skirt to permit any material located at edges of the compartment to fall off the edges of the compartment.

Preferably, the loading assembly comprises the loading assembly in accordance with the first aspect of the invention.

Preferably, the valve assembly further comprises means for maintaining the outer pipe section at a particular location along the inner pipe section.

Preferably, the means for maintaining the outer pipe section at a particular location along the inner pipe section comprises an assembly for moving the outer pipe section between a lower condition and an upper condition along the inner pipe section, the assembly comprising comprises a bar having an end pivotally attached to the inner wall of the loading assembly and another end attached to the outer pipe section having an upper pipe portion and a lower pipe portion.

Preferably, the another end of the bar comprises a horseshoe shaped end for receiving the upper outer pipe portion of the pipe section; and, at each end of the horseshoe, two bars extend towards lower pipe portion for attachment thereto.

Preferably, the distal end of the outer pipe portion comprises a flange defining a skirt for defining a void (an area without material) that allows any material that is at the lip (the upper edge) of the compartment to be spilled into the void.

Preferably, the pivotal movement of the bar driven via a hydraulic cylinder controlled by a control system in order to allow the outer pipe section to be located in particular positons along the inner pipe section to provide to the compartment the desired quantity to material.

According to an eight aspect of the invention there is provided a method for delivering material prone to be activated when in contact with atmospheric gases from a first location to a second location joined together by a conveyor chain, the method comprising the steps of:

loading the material into a loading hopper such that no contact between the material and atmospheric gases occur at the first location;

feeding particular quantities of materials to compartments of a conveyor chain within the loading hopper;

driving the conveyor chain through pipe assemblies defining the endless path of the conveyor chain such that no contact between the material and atmospheric gases occur during delivery of the material to the second location;

discharging the material contained in the compartments in a housing at the second location such that no contact between the material and atmospheric gases occur; and delivering the material into a vessel at the second location though a discharge tube such that no contact between the material and atmospheric gases occur.

Preferably, the loading hopper comprises the loading hopper of the loading assembly as defined in the first aspect of the invention.

Preferably, the housing comprises the housing of the discharge assembly as defined in the second aspect of the invention.

Preferably, the vessel comprises the vessel as defined in the fourth aspect of the invention.

Preferably, the discharge tube comprises the discharge tube as defined in the third aspect of the invention.

Preferably, the conveyor chain comprises the conveyor chain as defined in the fifth aspect of the invention.

Preferably, the material comprises catalyst media.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 4b is a cross-sectional view of the valve assembly included in the loading assembly;

It should be noted that the figures are schematic only and the location and disposition of the components can vary according to the particular arrangements of the embodiments of the present invention as well as of the particular applications of the present invention.

DESCRIPTION OF EMBODIMENT(S)

A particular embodiment of the invention relates to a conveyor system 10 for conveying material (for example: particulate material such as a catalyst) from a particular storage area (such as drum 18) to a second location (such as a reactor 13). In accordance with the present embodiment of the invention, the conveyor system 10 is adapted to isolate from the environment the particular material to be conveyed; thus, avoiding that the particular material enters in contact with, for example, the atmosphere. Isolating the particular material is particular advantageous; because, for example, the isolation process suppresses activation of the material (such as the catalyst) due to coming in direct contact with the oxygen and moisture content of the atmosphere.

Figure 1:
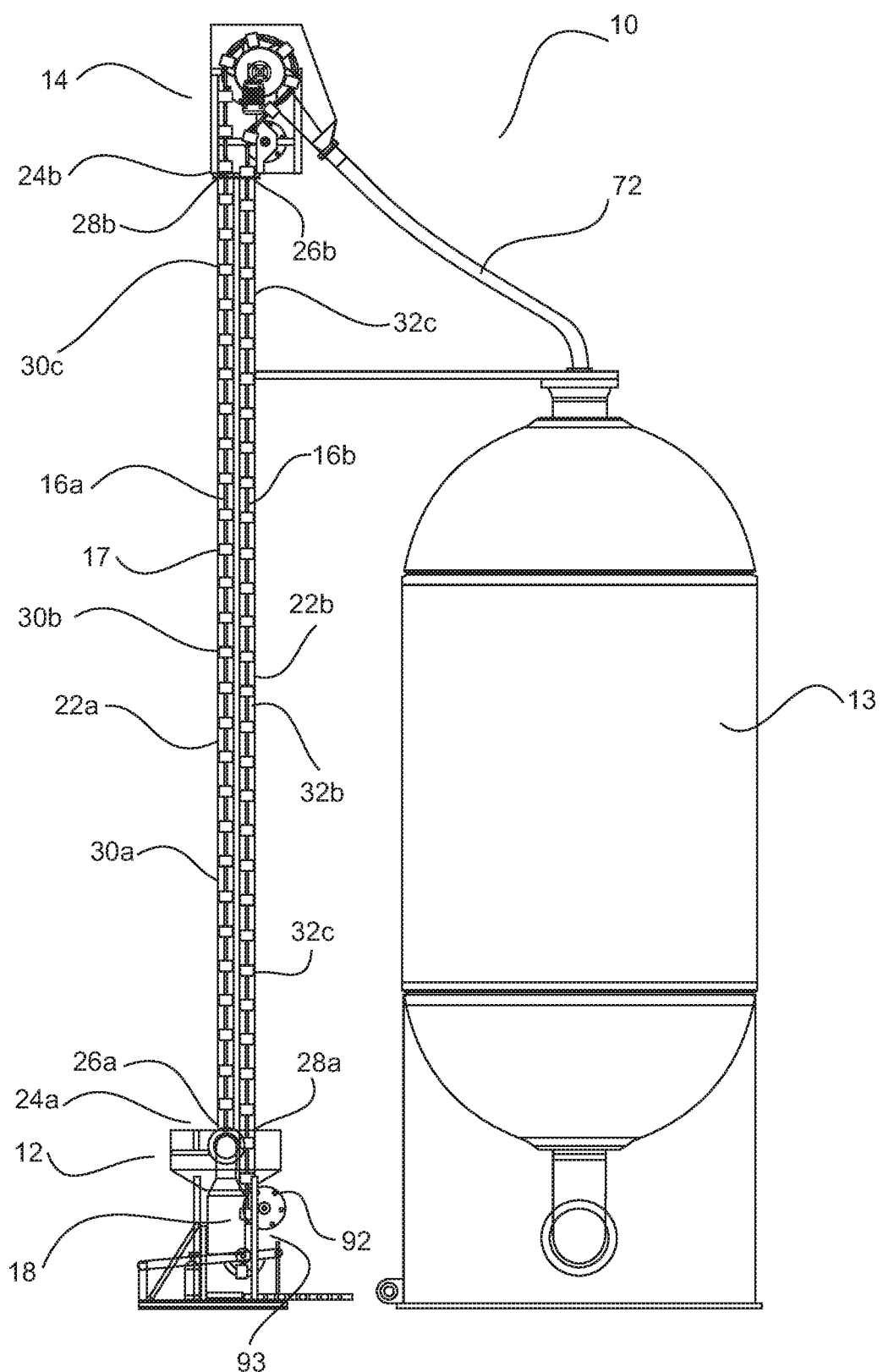
FIG. 1 is a perspective view of a particular arrangement of a conveyor system in accordance with an embodiment of the invention.

Referring now to FIG. 1, FIG. 1 shows a particular arrangement of a conveyor system 10 for conveying material (such as a catalyst) from a particular storage area to a second location such as with a reactor 13.

The particular arrangement of the conveyor system 10 shown in FIG. 1 comprises a loading assembly 12 and a discharge assembly 14. Assemblies 12 and 14 are joined together via a conveyor chain 16 permitting movement of the material from the loading assembly 12 to the discharge assembly 14. The conveyor chain 16 comprises a plurality of compartments 17 (such as buckets) arranged in a spaced apart relationship with respect to each other along the conveyor chain 16.

As shown in FIG. 1, the discharge assembly 14 is adapted to receive the material from a particular storage area. In the particular arrangement shown in FIG. 1, the storage area comprises a drum 18 including the material.

The loading assembly 12 is adapted to receive the content of the drum 18 in such a manner that no contact occurs between the material and the exterior of the loading assembly 12 avoiding that the material is activated due to atmospheric gas (such as oxygen and moisture) from coming in contact with the material.

Further, once the material is contained within the loading assembly 12, the material is conveyed to the discharge assembly 14 via the conveyor chain 16.

In the particular arrangement shown in FIG. 1, the conveyor chain 16 is contained within pipe assemblies 22a and 22b. The pipe assemblies 22 extend between the loading assembly 12 and the discharge assembly 14. The pipe assemblies 22 are adapted to isolate the material from the atmosphere as the material travels from the loading assembly 12 to the discharge assembly 14; for this, the ends 24 of the pipe assemblies 22 are sealingly attached to the outlets 26 and inlets 28 of the loading assembly 12 to the discharge assembly 14.

Further, the pipe assemblies 22 comprises a plurality of pipes 30 and 32. The pipes 30 extend from the outlet 26a of the loading assembly 12 to the inlet 28b of the discharge assembly 14 for conveying of the material (via the compartments 17 of the conveyor chain 16) to the discharge assembly 14. The pipes 32 extend from the outlet 26b of the discharge assembly 14 to the inlet 28a of the loading assembly 12 for returning of the empty compartments 17 of the conveyor chain 16 to the discharge assembly 14 permitting refiling of the compartments 17 and the subsequent delivery to the discharge assembly 14 for discharge of the material into the reactor 13.

As shown in the particular arrangement of FIG. 1, three pipes 30a to 30c are joined together for defining a first pipe assembly 22a having a plurality of pipes 30; also the pipes 32 are joined together for defining a second pipe assembly 22b having a plurality of pipes 32a to 32c.

In alternative arrangements, the first pipe assembly 22a as well as the second pipe assembly 22b may comprise any numbers pipes 30 (or 32) for joining together the loading assembly 12 and the discharge assembly 14. The particular number of pipes 30 and 32 used for defining the pipe assemblies 20 depend on, for example, (1) the length of each pipe 30 or 32 and (2) the distance that exists between the loading assembly 12 and the discharge assembly 14.

Further, the pipes 30 and 32 are shown as straight pipes 30 and 32; however, the pipes 30 and 32 may be configured to have any shape permitting joining the loading assembly 12 and the discharge assembly 14 that may be located, for example, in an industrial plant wherein the area between the loading assembly 12 and the discharge assembly 14 may comprise obstacles that would need to be circumvented by the pipes 30 and 32.

Figure 2:
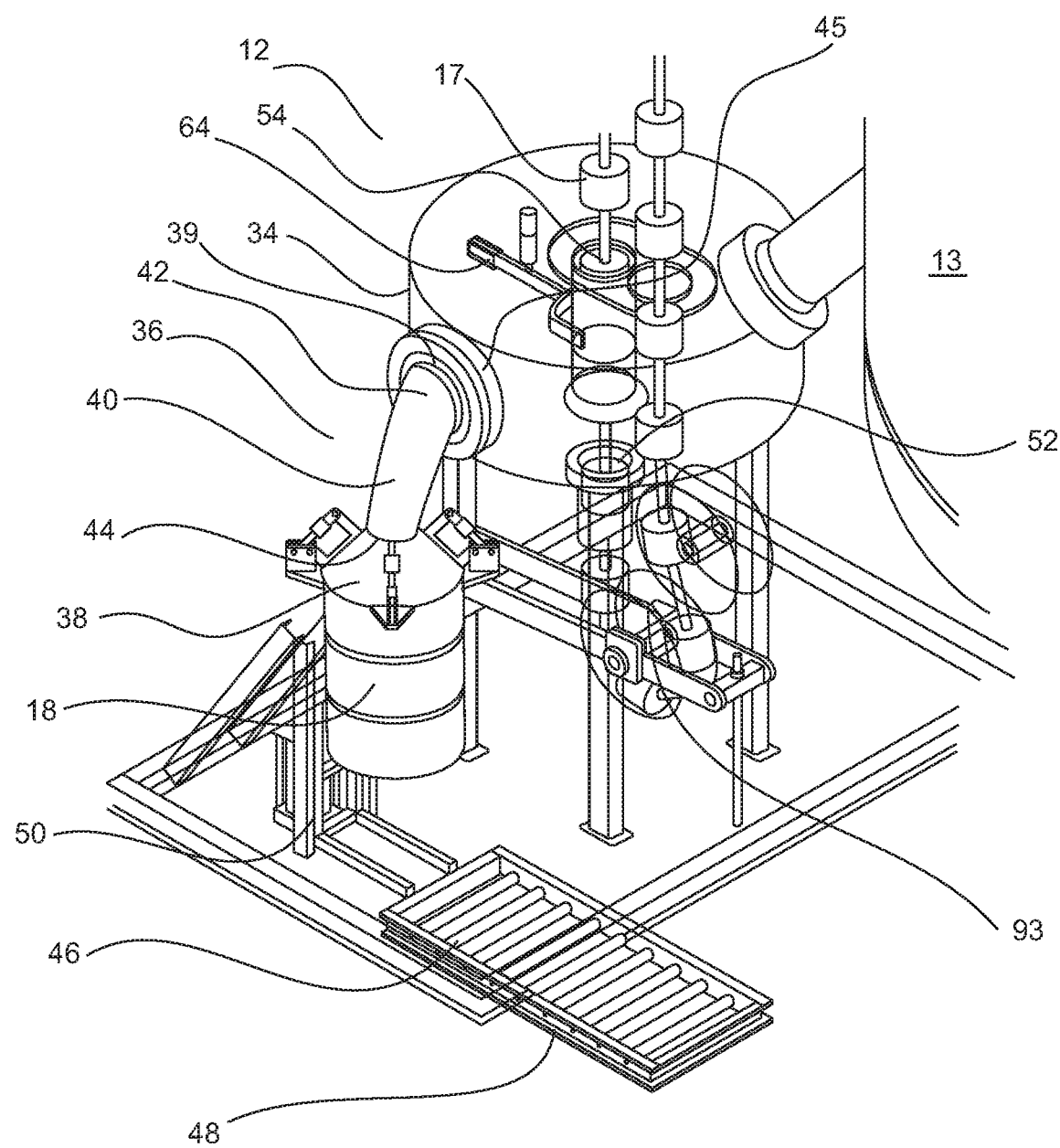
FIG. 2 is a perspective view of a particular arrangement of a loading assembly of the conveyor system shown in FIG. 1.

Referring now to FIG. 2, FIG. 2 shows a particular arrangement of the loading assembly 12.

The loading assembly 12 comprises a loading hopper 34 and a loading inlet 36 operatively connected to the loading hopper 34 to permit delivery of the material contained in the drum 18 into the loading hopper 34.

The loading inlet 36 comprises a chute section 40 having an end 42 adapted for sealing attachment to the loading hopper 34 and another end 44 adapted to be releasably and sealingly attached to the drum 18.

In the particular arrangement shown in FIG. 2, the end 42 is rotatably attached to the loading hopper 34 permitting rotation of the drum 18 for tipping of the drum 18 when the drum 18 is attached to the other end 44 of the chute section 40. Tipping of the drum 18 occurs via a driving mechanism 45 adapted to drive the rotational movement of the chute section 36. A valve arrangement 39 ensures that the inert atmosphere within the loading hopper 34 is maintained. The driving mechanism 45 comprises drive means for rotating the chute section 36.

Further, the other end 44 of the chute section 36 comprises a clamping assembly 38 adapted to receive the drum 18 (after the drum has been opened) and to clamp the one end of the drum 18 to the clamping assembly 38 for attachment of the drum 18 to the chute section 36 to permit rotation of the drum 18 to tip the drum 18 to deliver the material into the loading hopper 34.

Furthermore, as shown in FIG. 2, the loading assembly 12 further comprises a transportation mechanism 46 for delivering the drum 18 to the loading assembly 12. In particular, the transportation mechanism 46 comprises a track 48 for transporting of the drum. The loading assembly 12 also comprises a driving mechanism 50 for driving the drum 18 towards the clamping assembly 38. In the particular arrangement shown in FIG. 2, the driving mechanism 50 comprises a lifting mechanism such as a forklift.

In alternative arrangements, the track 48 may comprise a conveyor assembly for delivering from a remote location the drum 18 to the loading assembly 12 and for removing the drum 18 after the material has been loaded into the loading hopper 34. At this stage, another drum 18 may be delivered to the loading assembly 34 for subsequent lifting and tipping to discharge its content into the loading hopper 34. Further, the lifting and clamping of the drum 18 could also be automated allowing automation of the process for delivering the material (such as a catalyst) into the reactor.

After the material has been discharged into the loading hopper 34, a particular quantity of material is fed into each compartment 17 as the compartment 17 traverses the loading hopper 34 while the conveyor chain 16 is undergoing movement around its endless path.

Figure 3:
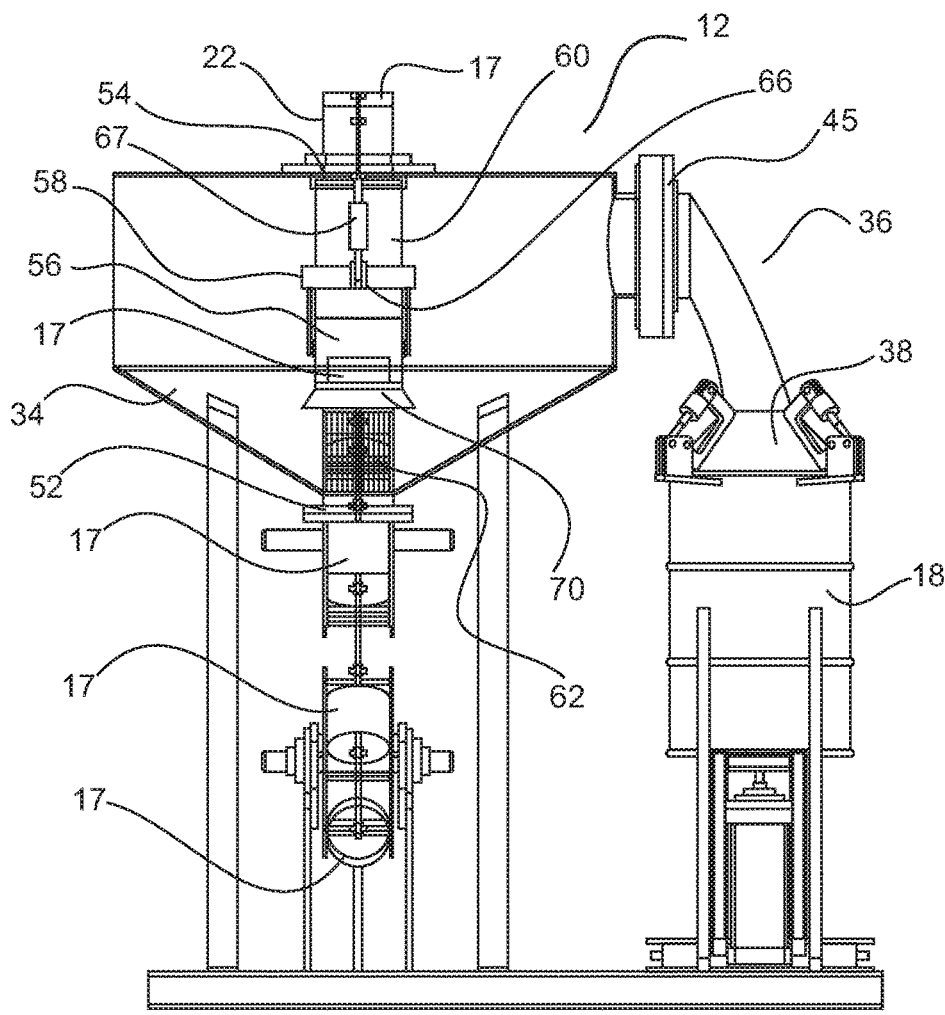
FIG. 3 is a perspective view of the loading assembly shown in FIG. 1 showing the interior of a loading hopper of the loading assembly.

The feeding process is shown in FIG. 3.

As shown in FIG. 3, the loading hopper 34 is adapted to permit the conveyor chain 16 to traverse the loading hopper 34; for this, the loading hopper 34 comprises an inlet 52 permitting entering of the conveyor chain 16 into the loading hopper 34 for collection of the material contained in the loading hopper 34.

The conveyor system 10 is adapted to allow the conveyor chain 16 to enter the loading hopper 34 in such a manner that the compartments 17 have their open end facing towards the inlet 52 permitting the compartments 17: (1) to collect the material once the compartments 17 are within the loading hopper 34 and (2) to exit the loading hopper 34 in an upright condition through an outlet 54 for movement towards the discharge assembly 12 as is shown in FIG. 2.

In the particular arrangement shown in the figures, the loading assembly 12 comprises a valve mechanism 56. The valve mechanism 56 comprises a pipe section 62 that traverses the loading hopper 34 from its inlet 52 to its outlet 56 permitting the conveyor chain 16 to slide through the pipe section 62 of the valve mechanism 56. The pipe section 62 is adapted to allow particular quantities of material to be fed into the compartments 17 as they traverse the pipe section 62. As shown, the lower end of the pipe section 62 comprises slots 114 to permit flow product for feeding of the compartment 17.

Figure 4A:
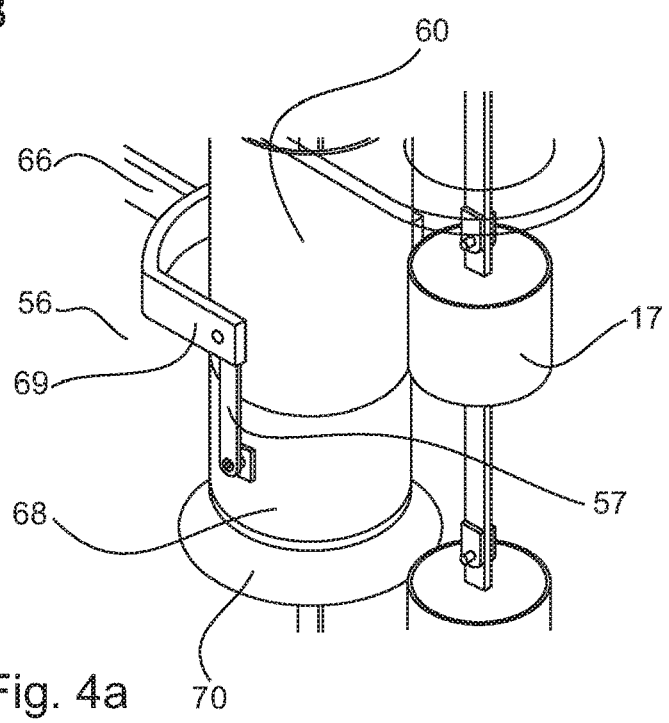
FIG. 4a is a detail of a particular arrangement of a valve assembly of the loading assembly shown in FIG. 2.
Figure 4B:
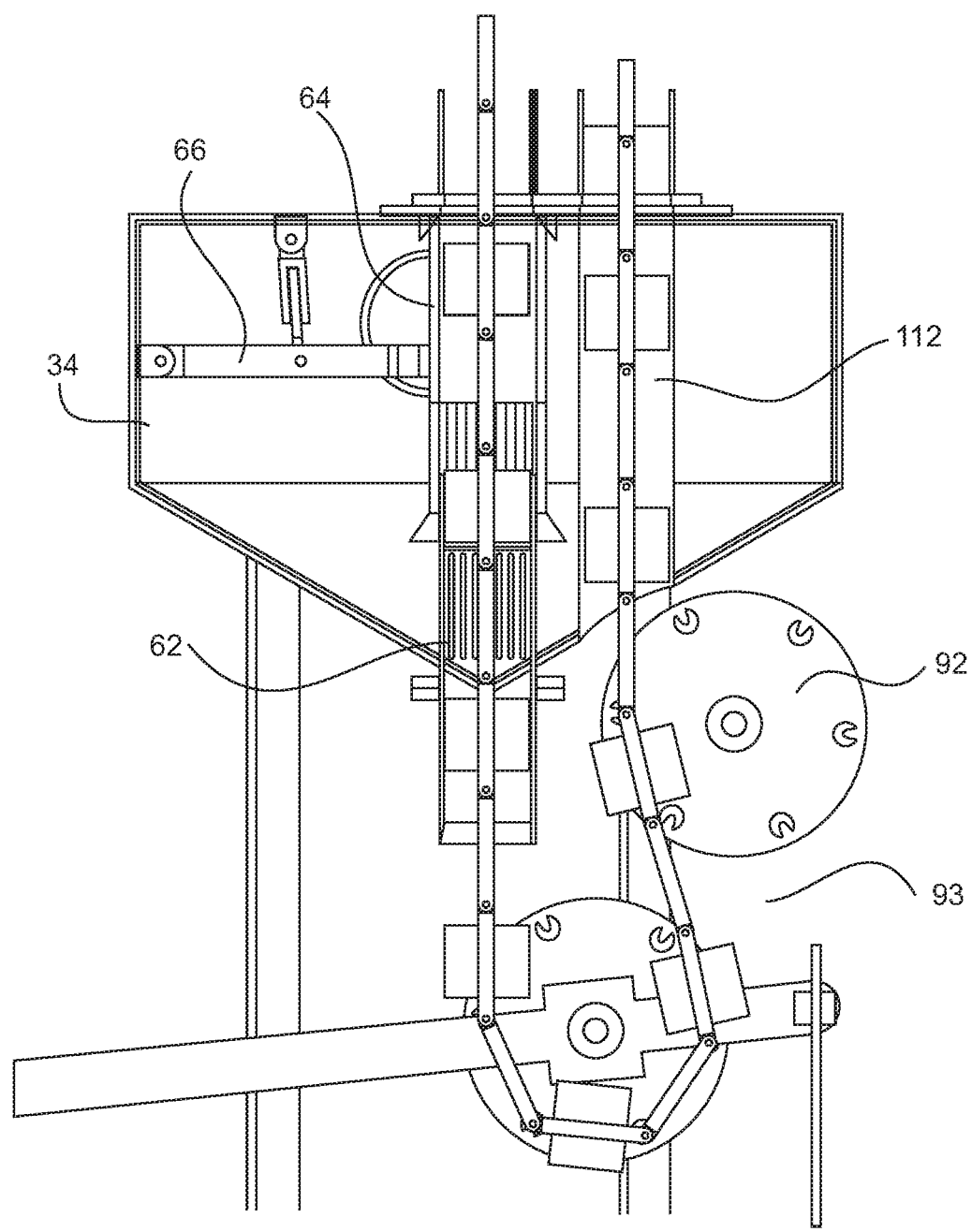
FIG. 4b is a cross-sectional view of the loading assembly.
Figure 4C:
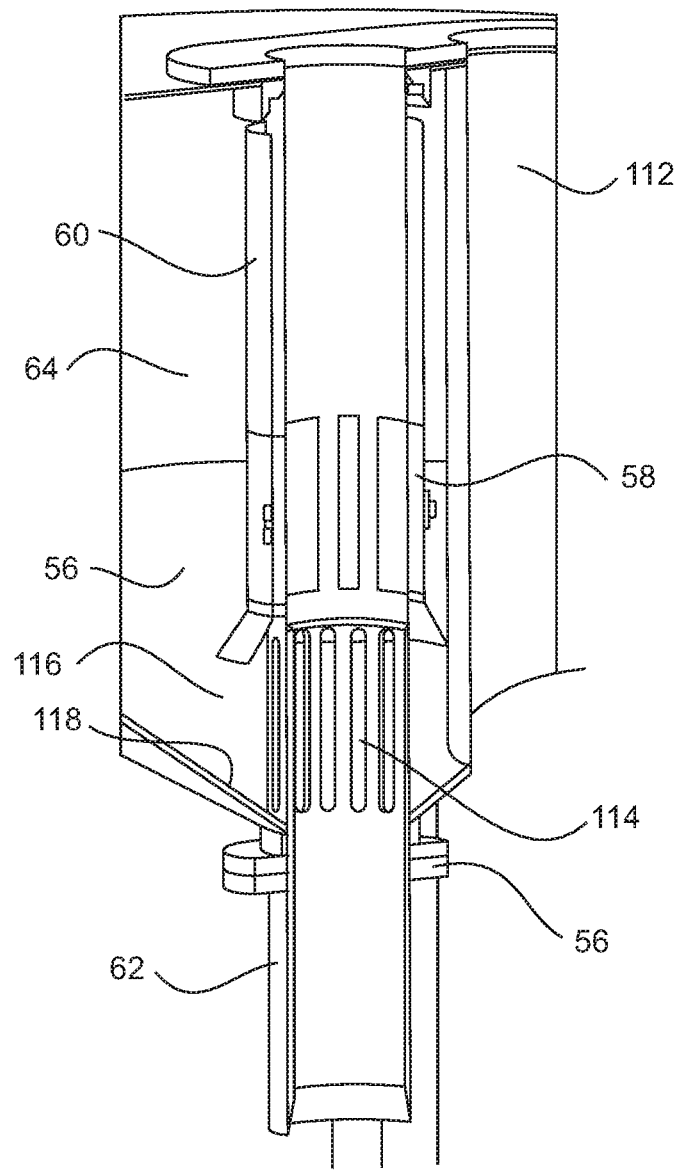
FIG. 4d is a is a cross-sectional view of the outer pipe section of the valve assembly.
Figure 4D:
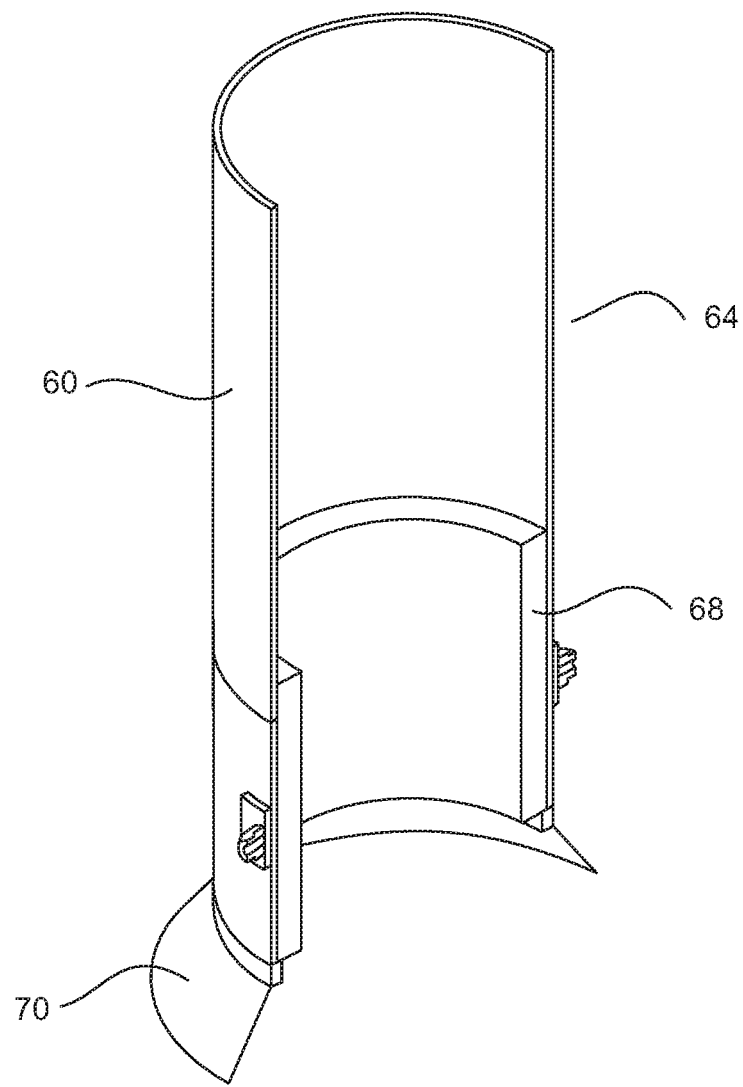

The valve mechanism 56 shown in FIG. 4c comprises an outer pipe section 64 surrounding the inner pipe section 62. The outer pipe section 64 is adapted to be located at particular locations along the inner pipe section 62 for adjusting the size of the aperture 116 defined between the bottom 118 of the loading hopper 34 and the lower end of the outer pipe section 64. Adjusting the size of the aperture 114 permits controlling the quantity of material that each compartment 17 will be fed as the compartment 17 traverses the pipe section 58. In particular, in the uppermost condition, a particular quantity of material will be fed into the compartment 17; in the lowermost condition, no material will be fed to the compartment 17. Thus, for example, by varying the location of the outer pipe section 64 along the inner pipe section 62, it is possible to control the quantity of material that is fed to a particular compartment 17 as it traverse the pipe section 58. Prior operation of the conveyor system 10, typically the outer pipe section 64 will be located at the lowermost condition; as operation starts, the particular location of the outer pipe section 64 may be varied so as to control the amount of material entering the compartments 17 as the compartments enter inner the pipe section 62. Varying the location of the outer pipe section 64 along the inner pipe section 62 is done via assembly 58 to be explained below.

As shown in FIG. 4a, the valve mechanism 56 comprises an assembly 58 (see FIG. 4c) for moving the outer pipe section 64 selectively between a lower condition and an upper condition along the inner pipe section 62. The assembly 58 comprises a bar 66 pivotally attached to the inner wall of the loading hopper 34 and extending towards the center of the loading hopper 34 for attachment to the outer pipe section 64—in particular, to a lower pipe portion 68 (the sliding bush) of the outer pipe section 64. The end of the bar 66 that is attached to the outer pipe section comprises a horseshoe shaped end 69 for receiving the upper pipe portion 60 (the shroud) of the outer pipe section 64; and, at each end of the horseshoe 69, two bars 57 extend towards the lower pipe portion 68 (the sliding bush) for attachment thereto permitting displacement of the outer pipe section 64 to adjustment of the size of the aperture 118.

The pivotal movement of the bar 66 is driven via a hydraulic cylinder 67 controlled by a control system in order to allow the outer pipe section 64 be located at particular positions along the inner pipe section 62 to provide the desired quantity to material. The shroud 60 is attached to the lower pipe portion 68 and flange 70 that creates the adjustable aperture 116 thru which the product flows into the slots 114 in the pipe section 62 and cascades into the bucket 17 as the compartment 17 passes in an upward direction. The flange 70 (the skirt) creates a void (an area without material) that allows any material that is at the lip (the upper edge) of the compartment 17 to be spilled into the void, avoiding attrition of the product. This is particularly advantageous because any material that is located at the edge of the compartment 17 may be crushed as the compartment 17 moves along the inner pipe section 62 and enters the pipe assembly 22.

Moreover, as mentioned before, the valve mechanism 56 is adapted to allow particular quantities of material to enter the pipe section 58 for delivery into each particular compartment 17 of the conveyor chain 16 that traverses the loading hopper 34. In particular, the valve mechanism 56 allows that the proper quantity be fed into each compartment 17 to ensure that proper feeding rate is achieved to load each compartment 17 depending on the particular speed of conveyor chain 16 during operation of the conveyor system 10.

In a particular arrangement, the valve mechanism 56 is adapted to permit filling 80% of each compartment 17. This results in the loading rates for compartments 17 being filled 80% (0.0034 m$^3$) at 12.1 m$^3$/hour as follows: 23.2 hours for 280 m$^3$, 12.4 hours for 150 m$^3$, and 5.4 hours for 65 m$^3$.

Moreover, as shown in FIG. 4b, the loading assembly comprises a passage 112 (located adjacent the pipe section 62) that traverses the loading hopper 34. The passage 102 does not permit communication between the inner volume of the loading hopper and the passage 112. The function of the passage 112 is for permitting traversing of the conveyor chain 16 as it returns from the discharge assembly 14.

Further, as shown in FIG. 4b, the conveyor chain 16 as it exits the passage 112 it engages the idle wheel system 94 for varying the direction of the travel of the conveyor chain 16 to permit the conveyor chain 16 to enter the pipe section 62 for the compartments 17 to collect particular quantities of material.

Figure 5:
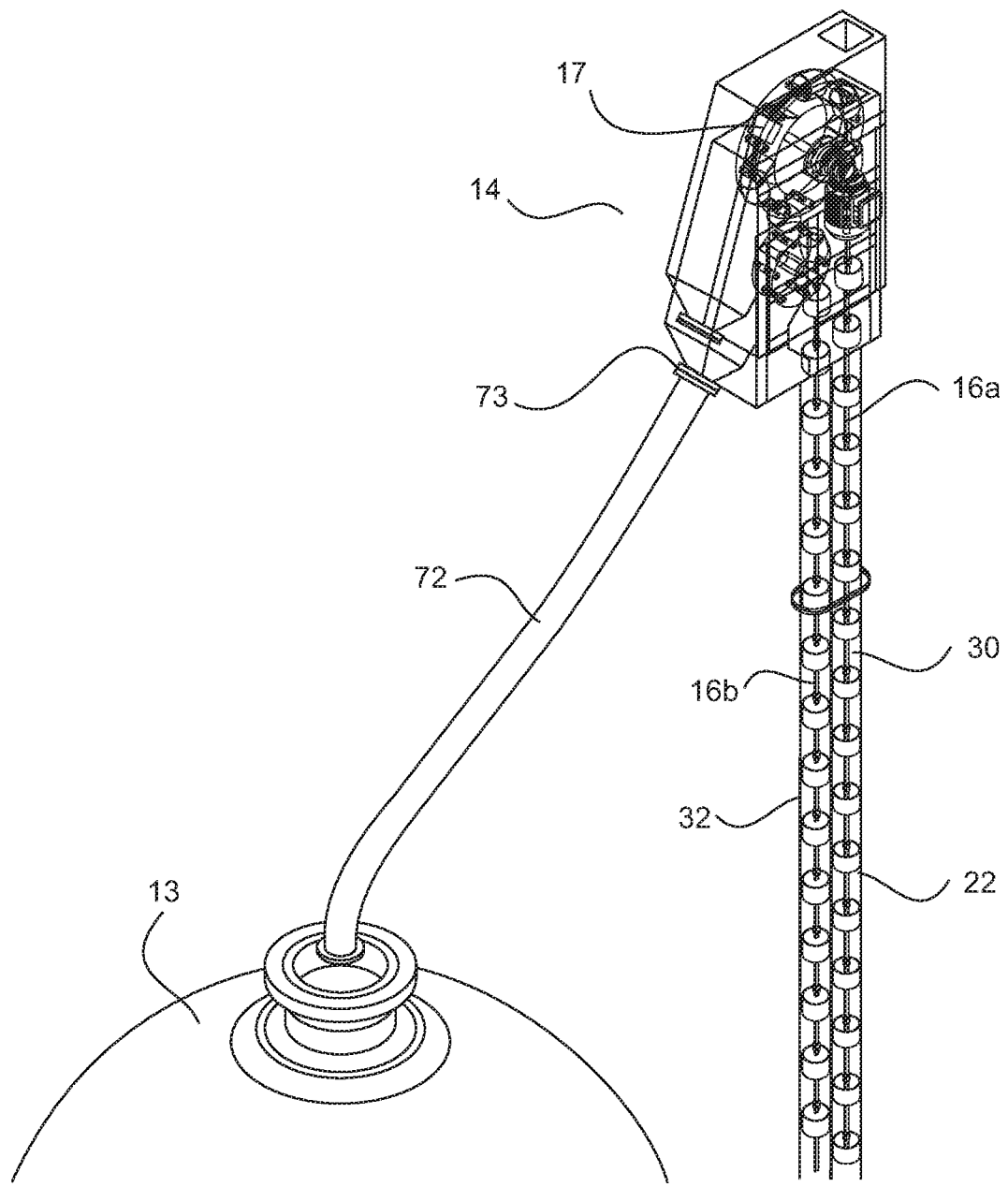
FIG. 5 is a perspective view of a detail of the upper portion of the conveyor system shown in FIG. 1 showing a particular arrangement of the discharge assembly of the conveyor system shown in FIG. 1.
Figure 6:
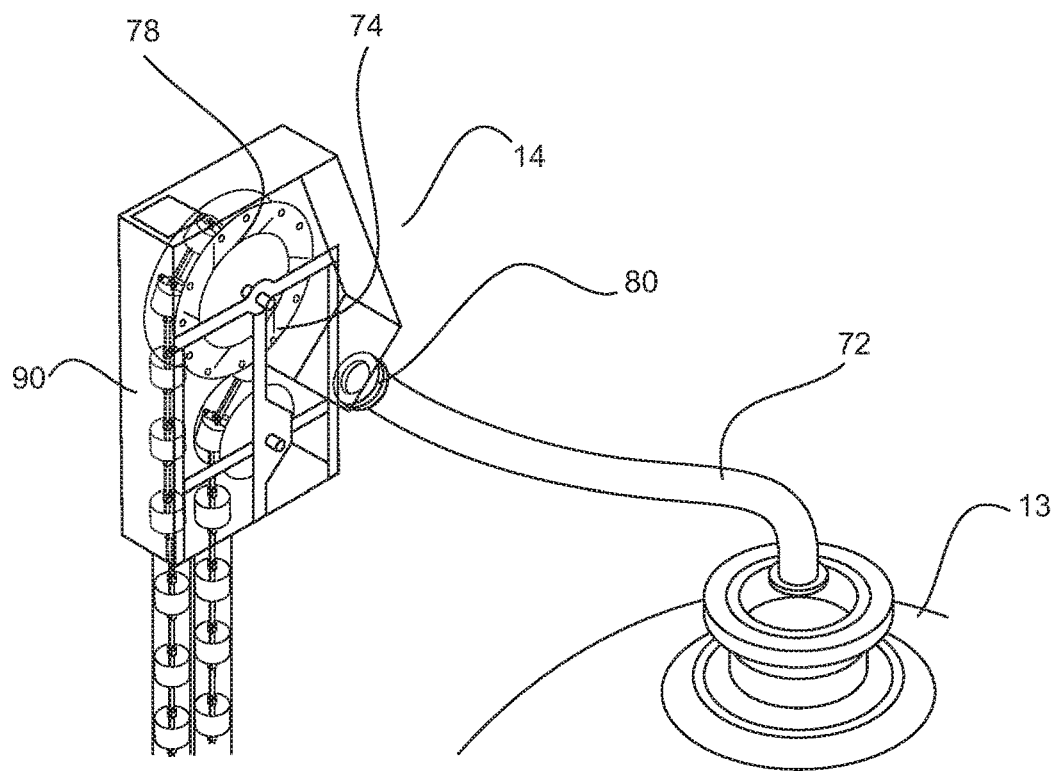
FIG. 6 is a perspective view of the discharge assembly shown in FIG. 5 with one of its sides covers removed for illustration purposes.
Figure 7:
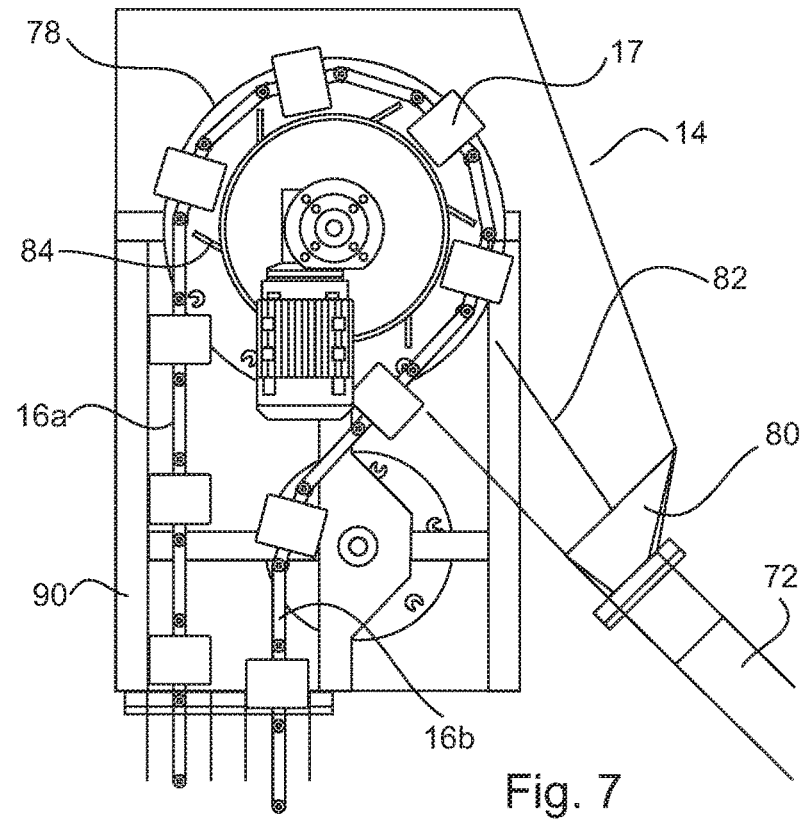
FIG. 7 is a side view of the discharge assembly shown in FIG. 5 showing the interior thereof.

Referring now to FIGS. 5 to 7, FIGS. 5 to 7 show a particular arrangement of the discharge assembly 14 of the conveyor system shown in FIG. 1.

Figure 11:
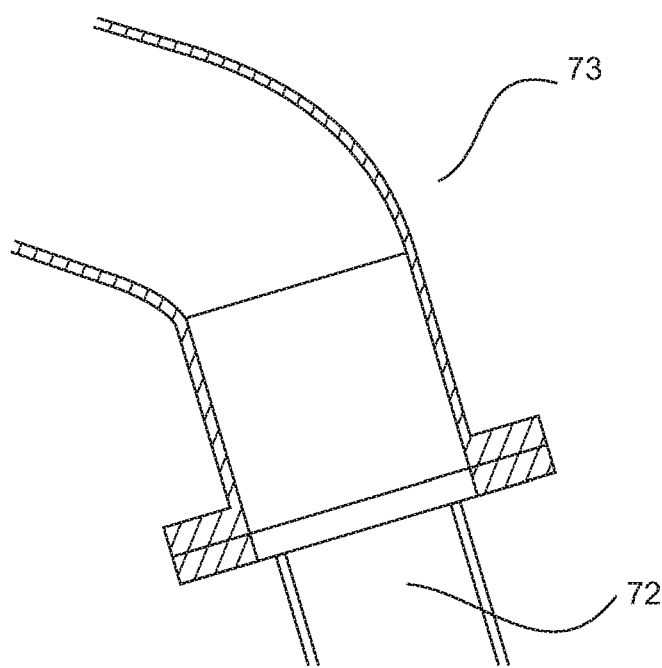
FIG. 11 is a side view of the connection between the discharge assembly and the proximal end of the discharge tube.

The discharge assembly 14 is adapted to receive the compartments 17 as the conveyor chain 16 enters the discharge assembly 14. Within the compartments 17, the compartments 17 are tilted so that the material be discharged from the compartments 17 and conveyed to the reactor 13 via the discharge pipe 72. The discharge pipe 72 comprises an end sealingly attached to the discharge assembly 14 and another end sealingly attached to the inlet of the reactor 13—in this manner, the material cannot enter into contact with, for example, the atmosphere. FIG. 11 shows the connection 73 between the discharge pipe 72 and the discharge assembly 14; the connection 73 comprises a flexible coupling maintaining inert purge of the material to be delivered to the reactor 13 via the discharge pipe 72.

In particular, as shown in FIG. 6, the discharge assembly 14 comprises a conveyor drive system 74 adapted to receive the conveyor chain 16 and apply a driving force to the conveyor chain 16; this moves the conveyor chain 16 around the endless path defined between the loading assembly 12 and the discharge assembly 14. The driving force is generated by a motor and gearbox system 76 (see FIGS. 7 and 8) adapted to be controlled for adjusting the speed of the conveyor chain 16.

The conveyor drive system 74 of the discharge assembly 14 comprises a main wheel 78 operatively connected to the motor and gearbox system 76. The main wheel 78 is adapted to be operatively attached to the conveyor chain 16 to the main wheel 78.

As shown in FIG. 7, the compartments 17 of conveyor chain 16 are tilted as they are moved within the discharge assembly 14 together with the movement of the main wheel 74. Tilting of the compartments 17 allows discharge of the material into a feed chute 80.

Figure 8:
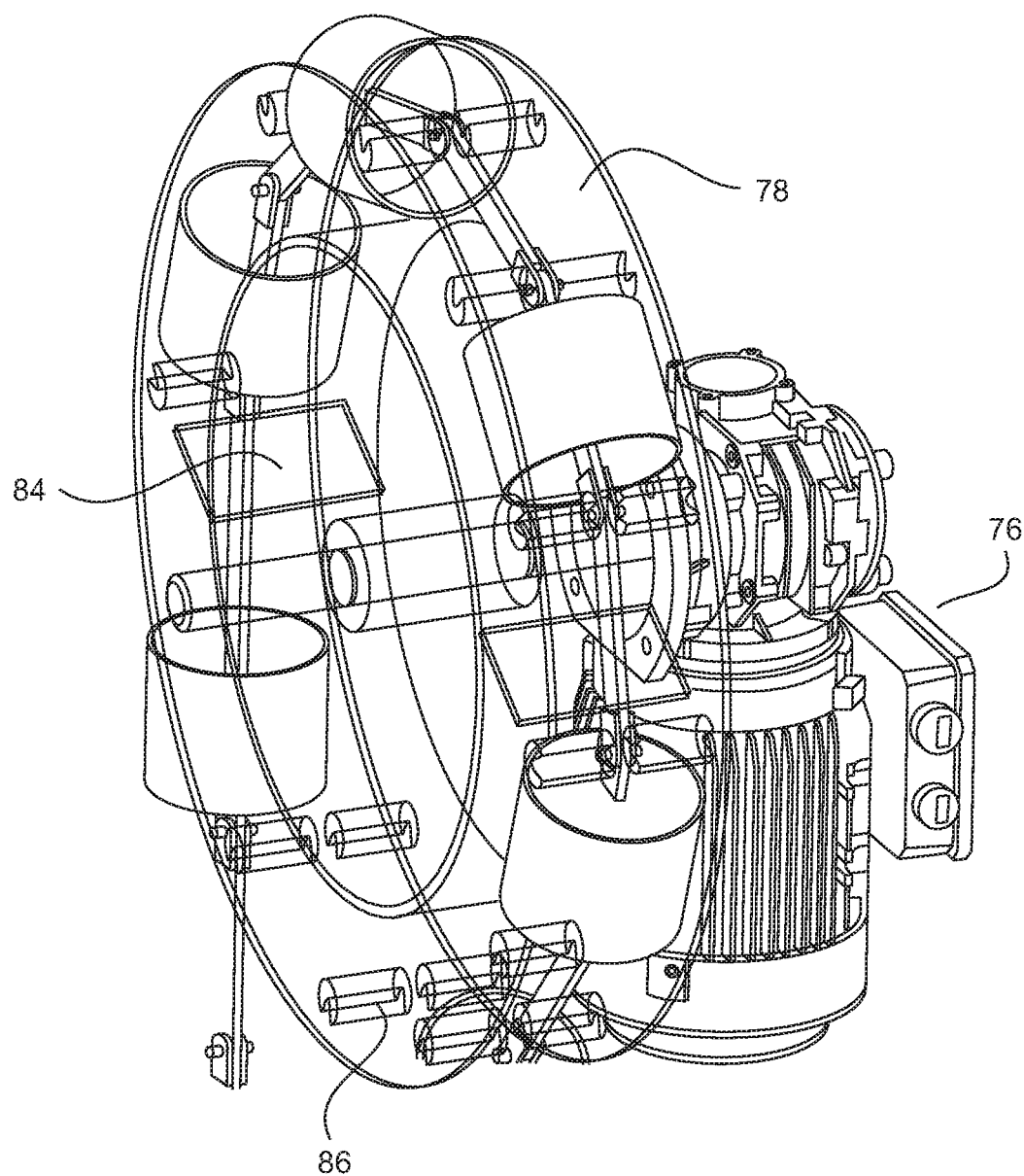
FIG. 8 is a perspective view of a detail of a particular arrangement of the conveyor drive system of the discharge assembly shown in FIG. 5.

As shown in FIG. 8, deflecting plates 82 and 84 direct material in direction to the feed chute 80. Plates 84 comprise slanted surfaces arranged in a circular spaced apart relationship with respect to each other on the main wheel 78. The particular location and inclination of the slanted plates 84 are chosen such that when the compartments 17 are tilted, the material will be directed into the feed chute 80 when the material hits the plates 84.

As mentioned before, the conveyor chain 16 is attached to the main wheel 78 for moving the conveyor chain 16 around is endless path. Attachment of the conveyor chain 16 occurs via attachments means 86 that are arranged in a circular spaced apart relationship with respect to each other on the outer periphery of the main wheel 78. As shown in FIG. 8, the attachments means 86 are adapted to releasable receive the links 94 of the conveyor chain 16 for driving of the conveyor chain 16.

Further, as mentioned before, the conveyor system 10 is adapted to convey the material from the drum 18 to the reactor 13 in such a manner the material is contained within, for example, an inert atmosphere and does not comes into contact with the atmospheric air, in particular oxygen. For this, the loading assembly 12 and the pipe assemblies 22 (formed by pipes 30 and 32) are adapted to isolate their interior from the atmospheric air.

Similarly, the discharge assembly 14 comprises a housing 90 comprising the outlet 26b and the inlet 28b adapted to receive the ends of a pipe 30 and 32 defining the pipe assemblies 22 through which the conveyor chain 16 travels for conveying the material form the loading assembly 12 to the discharge assembly 14. As is the case with the loading assembly 12 and the pipe assemblies 22, the housing 90 of the discharge assembly 14 is sealed from the atmosphere. In particular arrangements of the conveyor system 10, the interior of the loading assembly 12 and the piping (formed by pipes 30 and 32), the housing 90 of the discharge assembly may comprise inert gas to avoid any activation of the material due to contact with atmospheric gas such as oxygen.

Figure 9:
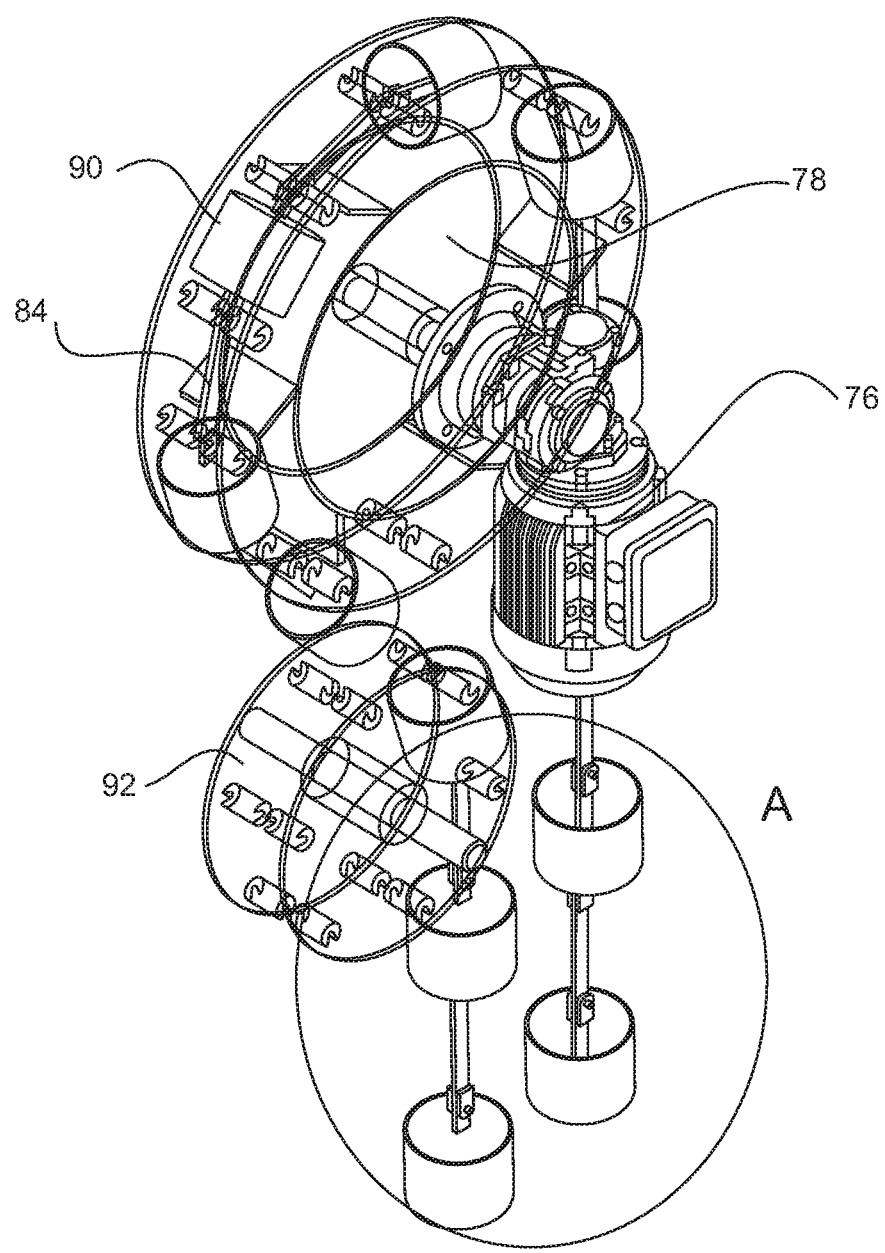
FIG. 9 is a perspective view of a detail of a particular arrangement of the driving mechanism within the discharge assembly shown in FIG. 5.

Furthermore, the particular arrangement of conveyor drive system 74 shown in the figures comprises, in addition to the main wheel 78, a deflecting wheel 92 (as shown in FIGS. 1 and 9, the loading assembly 12 also comprises a deflecting wheel 92. A particular function of the deflecting wheels 92 are to deflect the conveyor chain 16 as it exits the either the loading assembly 12 or discharge assembly 14. Deflection of the conveyor chain 16 by the deflecting wheel 92 ensures that one portion (numbered as 16b in FIG. 1) of the conveyor chain 16 is relative close to the other portion (numbered as 16a in FIG. 1) that enters the discharge assembly 14. This arrangement is particularly advantageous because it allows reducing the dimensions of the loading and discharge assembly 12 and 14 by keeping the pipe assemblies 22 adjacent to each other. Another advantage is that it creates a clear path for deflector 82 and 80 to allow the material not to stay cascaded on the bottom of bucket 17

Figure 10:
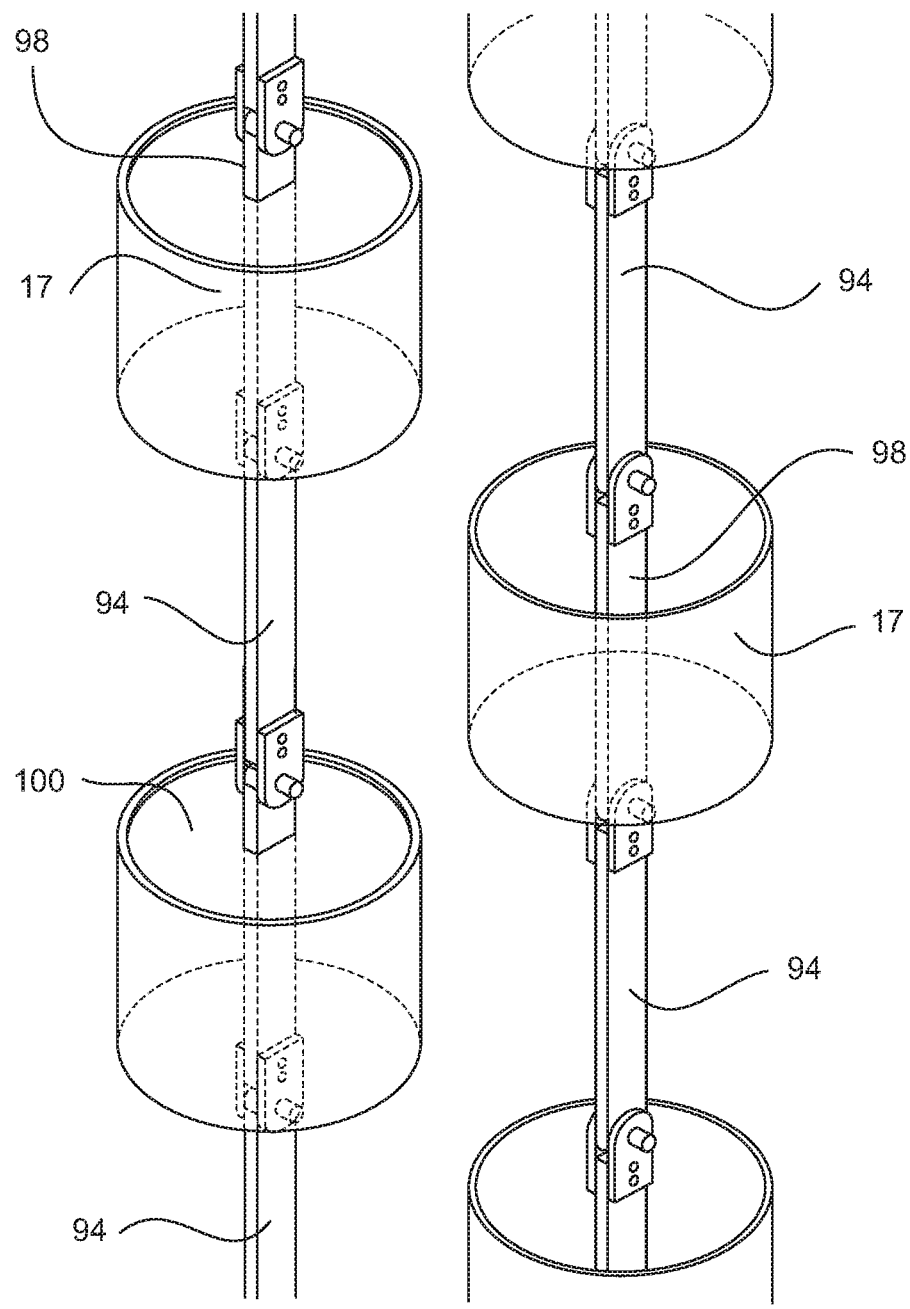
FIG. 10 is a perspective view of the detail A shown in FIG. 9 of a particular arrangement of a conveyor chain of the conveyor system shown in FIG. 1.

Moreover, FIG. 10 shows a detail A of the particular arrangement of the conveyor chain 16 shown in the FIG. 9. As shown in FIG. 10, the conveyor chain 16 comprises a plurality of compartments 17 (such as buckets) linked together by a link 94 with its ends pivotally attached to the ends of bars 98 that extend outward from each side of the bottom 100 of the compartment.

Figure 12:
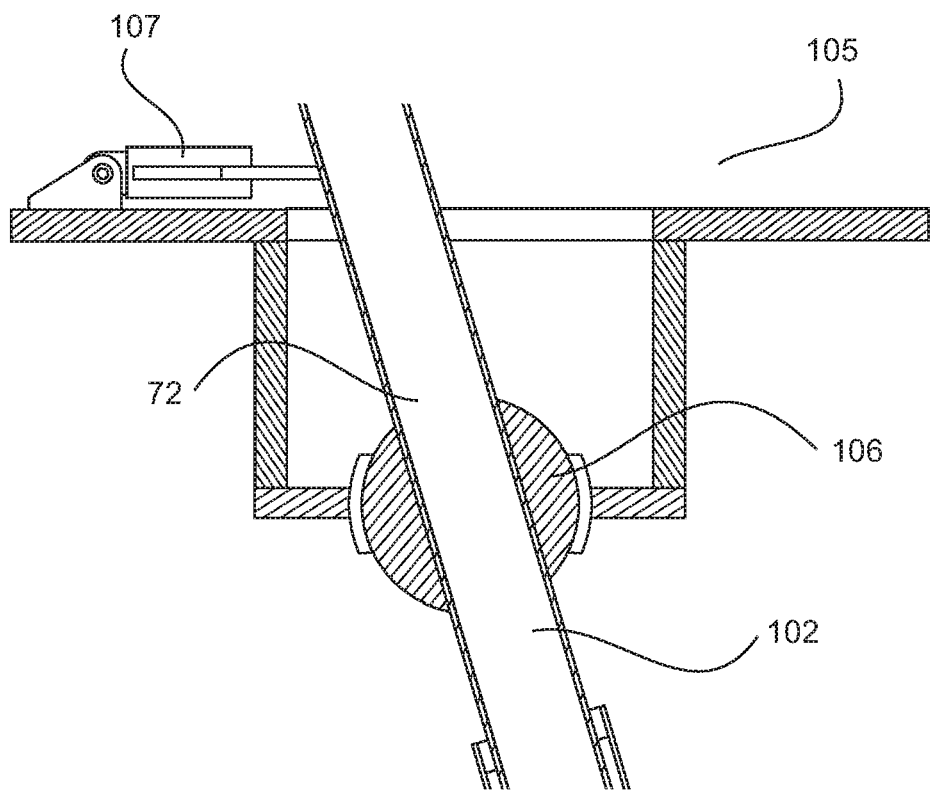
FIG. 12 is a perspective side view of the connection between the distal end of the discharge tube and the manway access of the reactor.

Referring now to FIG. 12, FIG. 12 show the distal end 102 of the discharge tube 72 inserted in the reactor 13 through the manway access 104, using a bearing support structure 105 mounted on the reactor 13. In this particular arrangement, the upper portion of the distal end 102 of the discharge tube 72 is pivotally attached to the bearing support structure 105 as is shown in FIG. 12 via a spherical bearing gimbal bearing arrangement 106.

Further, pivotal movement of the distal end 102 of the discharge tube 72 in the reactor 13 is driven by drive means 107 (such as a hydraulic arm). It is particularly advantageous that the distal end 102 of the discharge tube 72 be able to pivot during loading of the material into the reactor 13. For, this the drive means 107 are adapted to follow commands through a control system from a remotely located operator as well preprogramed parameters and patterns stored in the control means.

Further, there may be various designs of discharge tube 72 to facilitate specific requirements for access to offset manways and odd shaped vessels of the reactors 13, whilst maintaining a required fill pattern.

Figure 13:
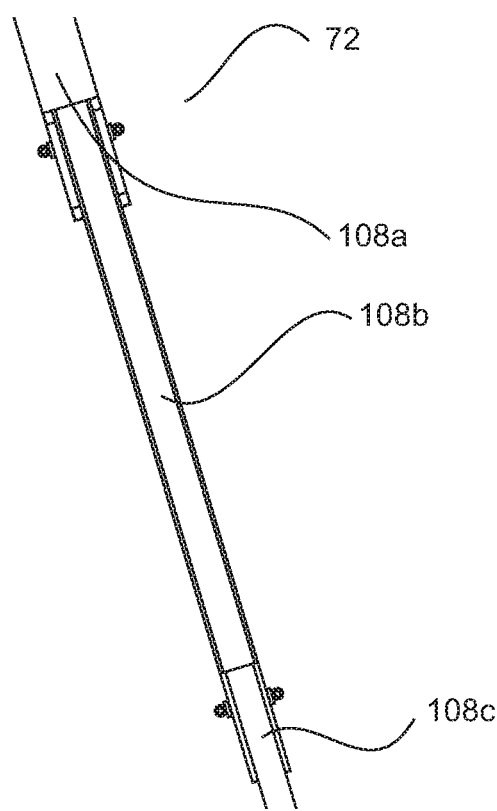
FIG. 13 detail of the distal end of the flexible discharge tube.

Furthermore, the discharge tube 72 is adapted to vary its length. As shown in FIG. 13, the discharge tube 72 will be of a concertina design comprising a plurality of telescopically arranged pipes 108. Varying the length of the discharge tube 72 may be done by mechanical means controlled by the remotely located operator via control means.

In an alternative arrangement, the discharge tube 72 may comprise plurality of tube sections adapted to be releasably attached to each other. This alternative arrangement is particularly useful because it permits varying the length of the discharge tube 72 with the objective of, for example, that the tube may reach the lowest levels within the vessel. In particular, the discharge tube 72 may comprise a plurality of tube sections 108 that may be screwed together defining a drill string type discharge tube having a length that can be extended or reduced by screwing or unscrewing tube sections 108 from the discharge tube 72 when desired.

Figure 14:
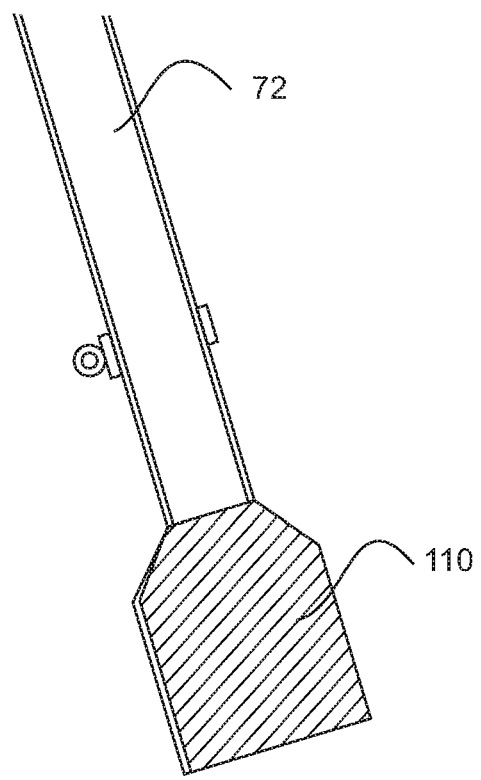
FIG. 14 is a detail of the end of the discharge tube comprising a diffuser.

Moreover, the end of the discharge tube 72 may comprise a diffuser 110 to aid in the discharge of dense loading of the material—see FIG. 14

In a particular arrangement, the conveyor system 10 is configured to permit operating the conveyor system 10 from a remote location with respect to the reactor 13. In this particular arrangement, control means are located at a remote location with respect to the reactor 13 and operatively connected to, for example: (1) the loading assembly 12 and the discharge assembly 14 including the motor and gearbox system 76 for controlling the speed of the conveyor chain 16 as well as the quantity of material that is being fed into the compartments 17 as they pass through the loading assembly 12; (2) the control means 107 for movement of the discharge tube 72; (3) means for varying the length of the discharge tube 72; (4) the means for purging and suppling inert gas to the conveyor system 10; and (5) means for delivering and tipping of the drums 18.

Moreover, the conveyor system 10 may comprise monitoring means (in communication with the control means) such as sensors and video cameras to permit monitoring the operation of the conveyor system 10 as well as the conditions within the conveyor system 10 to ensure that no contact between the material and atmospheric air occurs during operation of the conveyor system.

The control means is adapted to interact (via wires or wireless through for example the internet or Bluetooth connection) with an interface (such as computer hardware devices—such as laptops, tablets or PCs and/or mobile phones to permit the operator to interact remotely with the conveyor system 10 for operation thereof.

Modifications and variations as would be apparent to a skilled addressee are deemed to be within the scope of the present invention.

Further, it should be appreciated that the scope of the invention is not limited to the scope of the embodiments disclosed.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A valve assembly for feeding material to a compartment of a conveyor chain traversing a loading assembly containing the material, the valve assembly comprising an inner pipe section comprising slots for receiving material, and an outer pipe section surrounding the inner pipe section adapted to slide along the inner pipe section to locate the outer pipe section at a particular location along the inner pipe section for adjusting the amount of material that enters the inner pipe section, wherein a lower end of the outer pipe section comprises a flange for defining a skirt to create a void of material under the skirt to permit any material located at edges of the compartment to fall off the edges of the compartment.

2. A valve assembly according to claim 1 further comprising an assembly for moving the outer pipe section between a lower condition and an upper condition along the inner pipe section, the assembly comprising comprises a bar having an end pivotally attached to the inner wall of the loading assembly and another end attached to the outer pipe section having an upper pipe portion and a lower pipe portion.

3. A loading assembly for receiving material from a first location and providing material to at least one compartment of a conveyor chain for delivery to a second location, the loading assembly comprising a loading hopper having a first inlet adapted to deliver the material into an inner volume of the loading hopper and a first passage traversing the loading hopper adapted for the conveyor chain to traverse the loading hopper permitting delivery of at least a particular quantity of material to the compartment of the conveyor chain for delivery to a vessel, wherein the loading assembly further comprises a valve assembly comprising an inner pipe section comprising slots for receiving material, and an outer pipe section surrounding the inner pipe section adapted to slide along the inner pipe section to locate the outer pipe section at a particular location along the inner pipe section for adjusting the amount of material that enters the inner pipe section, wherein a lower end of the outer pipe section comprises a flange for defining a skirt to create a void of material under the skirt to permit any material located at edges of the compartment to fall off the edges of the compartment.

4. A loading assembly according to claim 3 wherein the inner volume is isolated from the exterior of the loading hopper.

5. A loading assembly according to claim 3 the first location comprises a storage area adapted to receive the material, wherein the storage area is isolated from the exterior of the storage area.

6. A loading assembly according to claim 3 wherein the second location comprises a vessel adapted to receive the material, wherein the vessel is isolated from the exterior of the storage area.

7. A loading assembly according to claim 3 wherein the first inlet is adapted to receive the storage area such that delivery of the material occurs isolated from the exterior of the loading hopper and the storage area.

8. A loading assembly according to claim 5 wherein the first inlet comprises a chute section having a first end adapted for sealing attachment to the loading hopper and a second end adapted to be releasably and sealingly attach the storage area to the second end, wherein the first end is rotatably attached to the first inlet permitting rotation of the storage area for tipping of the storage area.

9. A loading assembly according to claim 3 wherein the passage traversing the loading hopper comprises the valve assembly.

10. A loading assembly according to claim 3 wherein the first outlet is adapted to sealingly receive a first end of a first pipe assembly for receiving the conveyor chain, the first pipe assembly is adapted to provide an inner volume isolated from the exterior of the pipe assembly defining an isolated path for the conveyor chain to travel between the loading assembly and the second location.

11. A loading assembly according to claim 3 wherein the loading hopper comprises a third inlet adapted to sealingly receive a first end of a second pipe assembly for delivering the conveyor chain into the loading hopper after having returned from the second location.

12. A loading assembly according to claim 11 wherein the second pipe assembly is adapted to provide an inner volume isolated from the exterior of the pipe assembly defining an isolated path for the conveyor chain to travel between the second location and the first location.

13. A loading assembly according to claim 3 wherein the loading assembly comprises a second passage that traverses the loading hopper defines a path to permit traversing of the conveyor chain as it returns from the second location, wherein the interior of the path of the second passage is isolated from the inner volume of the loading assembly.

14. A valve assembly according to claim 1 wherein the inner pipe section comprises a length such that at all times two compartments are located within the inner pipe section to avoid loss of the material.

15. A conveyor system for delivering material from a first location to a second location, the conveyor system comprising a loading assembly for providing the material to at least one compartment of a conveyor chain at a first location for delivery to a second location, the loading assembly comprising a loading hopper having a first inlet adapted to deliver the material into an inner volume of the loading hopper and a first passage traversing the loading hopper adapted for the conveyor chain to traverse the loading hopper permitting delivery of at least a particular quantity of material to the compartment of the conveyor chain for delivery to a vessel, wherein the loading assembly further comprises a valve assembly comprising an inner pipe section comprising slots for receiving material, and an outer pipe section surrounding the inner pipe section adapted to slide along the inner pipe section to locate the outer pipe section at a particular location along the inner pipe section for adjusting the amount of material that enters the inner pipe section, wherein a lower end of the outer pipe section comprises a flange for defining a skirt to create a void of material under the skirt to permit any material located at edges of the compartment to fall off the edges of the compartment.

16. A conveyor system according to claim 15 including a first pipe assembly adapted to provide an inner volume isolated from the exterior of the pipe assembly defining an isolated path for the conveyor chain to travel between the loading assembly and the second location.

17. A conveyor system according to claim 16 wherein the second location comprises a discharge assembly having an inlet adapted to sealingly receive a first end of the first pipe assembly for receiving the conveyor chain.

18. A conveyor system according to claim 16 wherein a third outlet of the loading assembly is adapted to receive a second end of a second pipe assembly.

19. A conveyor system according to claim 17 wherein the second pipe assembly is adapted to provide an inner volume isolated from the exterior of the pipe assembly defining an isolated path for the conveyor chain to travel between the second location and the first location.

20. A conveyor system according to claim 15 wherein each compartment comprises a bucket.

* * * * *